(12) United States Patent
Lambrechts et al.

(10) Patent No.: US 6,909,378 B1
(45) Date of Patent: Jun. 21, 2005

(54) METHOD AND SYSTEM FOR UPGRADING A UNIVERSAL REMOTE CONTROL

(75) Inventors: Marc Emiel Celine Lambrechts, Leuven (BE); Stefaan Marcel Maria Note, Leuven (BE); Johan Agnes Emile Wouters, Leuven (BE); Rudy Musschebroeck, Leuven (BE)

(73) Assignee: Koninklije Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/718,259

(22) Filed: Nov. 22, 2000

(30) Foreign Application Priority Data

Nov. 26, 1999 (EP) ............................................. 99203988

(51) Int. Cl.⁷ .............................................. G05B 19/02
(52) U.S. Cl. .............................. 340/825.22; 340/825.24
(58) Field of Search ....................... 340/825.22, 825.23, 340/825.24, 825.25, 825.27, 825.29, 825.72; 341/176; 359/146, 148; 455/151.4, 352; 379/102.01

(56) References Cited

U.S. PATENT DOCUMENTS

| | | | |
|---|---|---|---|
| 4,623,887 A | | 11/1986 | Welles .......................... 340/825 |
| 5,404,393 A | * | 4/1995 | Remillard ..................... 379/96 |
| 5,629,868 A | | 5/1997 | Tessier et al. ........... 364/514 R |
| 5,689,353 A | | 11/1997 | Darbee et al. ............... 359/148 |
| 5,819,294 A | | 10/1998 | Chambers .................... 707/104 |
| 5,852,615 A | * | 12/1998 | Holo et al. ................. 371/20.1 |
| 5,872,562 A | * | 2/1999 | McConnell et al. ......... 345/169 |
| 6,008,735 A | * | 12/1999 | Chiloyan et al. ....... 340/825.22 |
| 6,018,775 A | * | 1/2000 | Vossler .......................... 710/1 |
| 6,021,319 A | * | 2/2000 | Tigwell .................... 455/151.2 |
| 6,157,982 A | * | 12/2000 | Deo et al. .................... 711/100 |
| 6,256,378 B1 | * | 7/2001 | Iggulden et al. ........ 379/103.03 |
| 6,392,534 B1 | * | 5/2002 | Flick .......................... 340/426 |

FOREIGN PATENT DOCUMENTS

| | | | |
|---|---|---|---|
| EP | 0903710 A2 | 3/1999 | ........... G08C/19/28 |
| WO | WO9950807 | 10/1999 | ........... G08C/19/28 |

* cited by examiner

*Primary Examiner*—Brian Zimmerman
*Assistant Examiner*—Nam Nguyen
(74) *Attorney, Agent, or Firm*—Gregory L. Thorne

(57) ABSTRACT

A method of and a system for upgrading a universal remote control with a command code of an electronic appliance are provided. The command code is downloaded from an internet server into a personal computer or set-top box, which is coupled to an infrared transmitter. The universal remote control is placed in front of the infrared transmitter and the command code is transferred to the universal remote control, for example in response to the user indicating a key, shown in a displayed picture of a control panel of the electronic appliance and associated with said command code.

15 Claims, 4 Drawing Sheets

METHOD AND SYSTEM FOR UPGRADING A UNIVERSAL REMOTE CONTROL

FIELD OF THE INVENTION

The invention relates to a method of upgrading a universal remote control with command codes for controlling an electronic appliance, the universal remote control having an infrared (IR) receiver for receiving the command codes.

The invention further relates to a system of upgrading a universal remote control with command codes for controlling an electronic appliance, the system comprising a universal remote control having comprising an infrared (IR) receiver for receiving the command codes.

The invention further relates to a universal remote control and a data processing device for use in the above system.

BACKGROUND OF THE INVENTION

Modern electronic appliances are often capable of being controlled remotely. For example, they are supplied with a remote control which allows the user to enter commands, which are then sent to the device by, for example, infrared (IR) signals. As the number of such appliances increases, users are faced with a plurality of remote controls. This is inconvenient, because it is difficult to keep track of where each of the remote controls is located, and which remote control belongs to which device. Moreover, each remote control has a different lay-out which has to be learned and remembered by the user. To solve this problem, universal remote controls are known, for example from U.S. Pat. No. 4,623,887, which store IR codes for a large number of devices and allow the user to control all those devices by a single remote control. For that purpose, the universal remote control has a large number of buttons to enable the user to select an appliance to be controlled and to control the specific functions of all individual appliances. To control a particular device, the user has to select an appliance, aim at it with the remote control and operate the buttons which are suitable for controlling the device. It is further known to provide a universal remote control with learning which allow IR codes of a new appliances to be learned, so that the new device can subsequently be controlled with the universal remote control. IR codes for a specific appliance are entered into a universal remote control by placing the universal remote control and the remote control of the appliance face to face. Generally, the universal remote control must be set to a learning mode and repetitively a key of the universal remote control is selected and a corresponding key of the other remote control is pressed, causing a command code to be transmitted to the universal remote control and associated with the selected key. A disadvantage of this method is that the remote control of the appliance has to be present and operational. This is often not the case, e.g. if a user lost its old universal remote control and now wants to put a new one into use, the remote controls of the various appliances may not be present anymore or their batteries may be empty.

OBJECT AND SUMMARY OF THE INVENTION

It is an object of the invention to provide a system and method, wherein the source remote control need not be present. To achieve that object, the method according to the invention is characterized by the steps of:

receiving command codes for controlling said electronic appliance from a data source and storing said command codes in a data processing device, and transmitting said command codes from said data processing device to said universal remote control through an IR transmitter coupled to said data processing device.

The data processing device may be a personal computer (PC) or a set-top box (STB), which comprises or is coupled to an IR transmitter. Such IR transmitters are currently available (so called 'dongles') and may, for example, be connected to the serial port of a PC. Alternatively, a transmitter may be integrated into the data processing device. The command code can be received by the data processing device in various ways, e.g. on a data carrier such as a CD-ROM or via a communication network from a remote database. Alternatively, the data processing device further comprises an IR receiver for learning the command code from the remote control of the electronic appliance, enabling a user to dispense with the remote control, the command code remaining stored in the data processing device for later use, for example on an internal hard-disk. Having stored the command code in the data processing device, the universal remote control can learn the command code by receiving IR codes from the data processing device, the latter thus acting as a remote control replacing the source remote control. The universal remote control may have prestored command codes in a read-only memory (ROM) for controlling one or more predetermined electronic appliances, the learned command codes being additionally stored in a read-write random access memory (RAM). Alternatively, the universal remote control is initially 'empty', i.e. has no prestored command codes, thus requiring all command codes to be learned through the IR receiver. Dependent on the amount of RAM, command codes can be learned for controlling only one electronic appliance at a time or a plurality of electronic appliances simultaneously.

The simplest way of teaching command codes to the universal remote control in accordance with the method of the invention is by iteratively selecting a key of the universal remote control, selecting a command code stored in the data processing device, and transmitting the command code to the universal remote control. For the purpose of selecting a command code, the data processing device may, for example, comprise a display screen for presenting a list of commands to the user, enabling the user to pick one of the commands from the list in order to transmit the corresponding command code to the universal remote control. Such a list may comprise text based commands or iconic representations.

An advantageous embodiment of the method according to the invention is in that the method further comprises a step of displaying a picture of at least a part of a control panel of the electronic appliance on a display screen coupled to the data processing device, and user operably selecting a command code to be transmitted to the universal remote control by indicating in said picture a control of the control panel associated with said command code. In this way a highly intuitive learning procedure is obtained. Command codes of the electronic appliance are selected by pointing to graphical keys on a 'virtual remote control' on the display screen instead of pressing the actual keys.

A further embodiment of the method according to the invention is characterized in that the method further comprises a step of defining an ordering of the keys of the universal remote control, and a step of automatically selecting a selected key of the universal remote control in accordance with said ordering. To simplify and speed up the updating of the universal remote control, this embodiment provides an "automatic" learn mode. The difference with a "manual" learn mode is that the target keys on the universal remote control must no longer be pressed one by one individually, but they are all in turn selected in a fixed sequence known by the user (indicated in the manual or graphically if it is an LCD or touch screen remote). All the user now has to do is press the correct key on the virtual remote control on the display screen of the data processing device to learn the target button. After successful learning, the universal remote control gives an auditive (or other) feedback to the user, indicating that the next key of the sequence is ready to be learned. A different feedback should be given to the user when learning has failed. In that case the user has to repeat learning of the same key. At the end of learning of the new command code set a different feedback signal is given to the user.

A further embodiment of the method according to the invention is characterized in that the method further comprises a step of defining a further ordering of command codes of the electronic appliance corresponding to said ordering of the keys of the universal remote control, and a step of automatically selecting a command code to be transmitted to the universal remote control in accordance with said further ordering. This embodiment provides a further simplification of the learning process. This is achieved by storing in the data processing device also information about the universal remote control, namely the sequence of the keys in the automatic learn mode. Typically, the command code set is delivered by the manufacturer of the universal remote control, hence it is no problem to supply the information with it. With this embodiment of the method according to the invention the user no longer has to press the specific key of the virtual remote, but it is enough to click on, for example, "next" after a successful learn, or "repeat" after a fail. In the meantime the virtual remote can also show (blinking or highlighting) which key is being learned. When learning the last code of a command code set, the "next" button is no longer visible (only "repeat").

After a learn attempt for a new key, the user still has to push a key ("next" or "repeat"). In a further embodiment this drawback is eliminated by generating a feedback signal indicating the success of each learn operation and making this feedback signal available to the data processing device in some way. This could be done by using any feedback link, a microphone to detect the audio signal of the universal remote control, a light sensor to capture light from LEDs on the universal remote control, reception of IR signals emitted by the universal remote control, or a wired serial link to the data processing device, etc. In the case a dongle is used by the data processing device to send the IR codes, an IR receiver can be integrated in this dongle to receive feedback information sent by the target remote. Only two different feedback signals are required, "successful learning" and "learn failure", in order to enable the data processing device to decide whether to proceed to the next command code or to repeat the previous one. Additional information regarding the cause of the learn failure, the end of the sequence, the selected device mode can be added if the feedback link allows this. The data processing device can then be further improved to teach, for example, several modes (TV,VCR,. . .) to the universal remote control in a single sequence requiring no further user interaction. The user only has to select command code sets for the different modes, set the universal remote control to the in automatic learn mode, position it correctly in front of the IR emitter and launch the sequence on the data processing device.

A further embodiment of the method according to the invention is characterized in that the method further comprises a step of associating a device category and a function category with a command code, a step of transmitting said device category and said function category along with the command code to the universal remote control, and a step of automatically selecting a selected key of the universal remote control in accordance with said device category and said function category. It is thus achieved that the universal remote control can automatically map a received command code to the appropriate key. For example, a key of the universal remote control may be associated with a video recorder (VCR) device category and a record function category. As soon as a command code is received which is associated with the categories, the command code is automatically mapped to the key. The category information may, for example, be received from the data source.

It is to be noted that U.S. Pat. No. 5,689,353 discloses a universal remote control utilizing a serial interface connection between a personal computer and the universal remote control to transfer signals from the personal computer to the universal remote control. However, this requires the incorporation of additional hardware, e.g. an RS232 port, into the universal remote control, which makes it more expensive. Moreover, setting up such a connection is not user-friendly: an interface cable is required, and the interface port of a personal computer is often located at the back and hence difficult to access.

BRIEF DESCRIPTION OF THE DRAWINGS

These and other aspects of the invention are apparent from and will be elucidated, by way of non-limitative example, with reference to the embodiment(s) described hereinafter. In the drawings.

DESCRIPTION OF EMBODIMENTS

Figure 1:
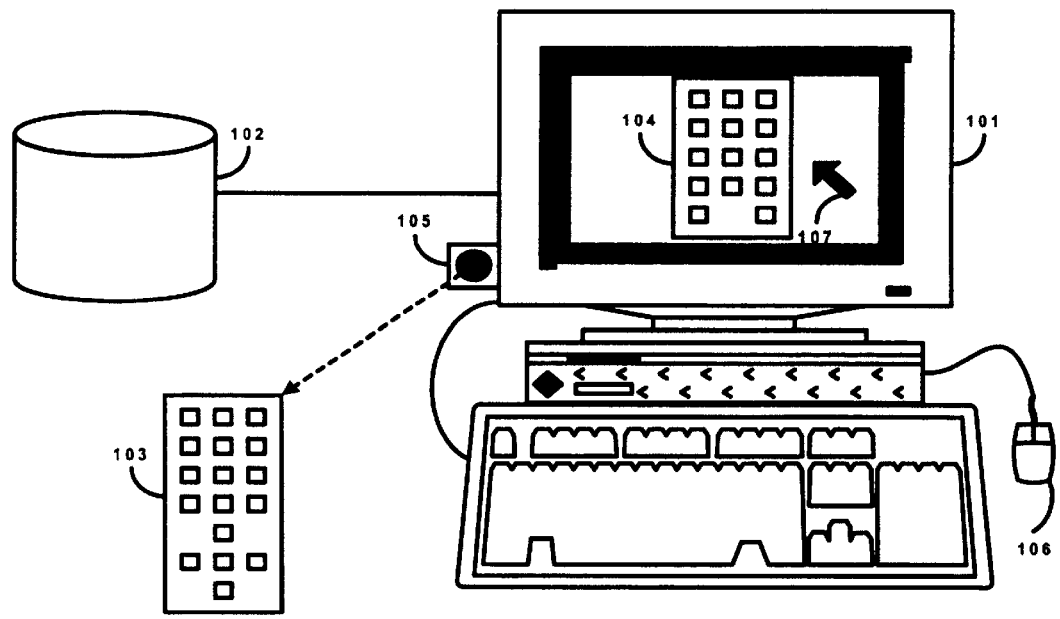
FIG. 1 shows an overview of a system according to the invention.

FIG. 1 shows an overview of a system according to the invention. The system comprises a personal computer 101 (PC), a remote database 102 and a universal remote control 103. The PC 101 is capable of communicating with the remote database 102, in particular for downloading a command code set for a remote control, and a graphical or photographic picture 104 of the remote control. The communication may be via a telephone line, a cable network or a wireless network. Typically, the remote database is an internet server. The PC 101 is capable of displaying the picture 104 on its display screen, and allows a user to select a key of the remote control within the picture 104 by a mouse 106, which controls the position of a cursor 107. The PC 101 is coupled to an IR transmitter 105. When a user selects a key from picture 104, the command code associated with the selected key is transmitted to the universal remote control 103 by the IR transmitter 105. The universal remote control 103 receives the command code by its IR receiver (not shown), which is a standard component of every universal remote control.

Figure 2:
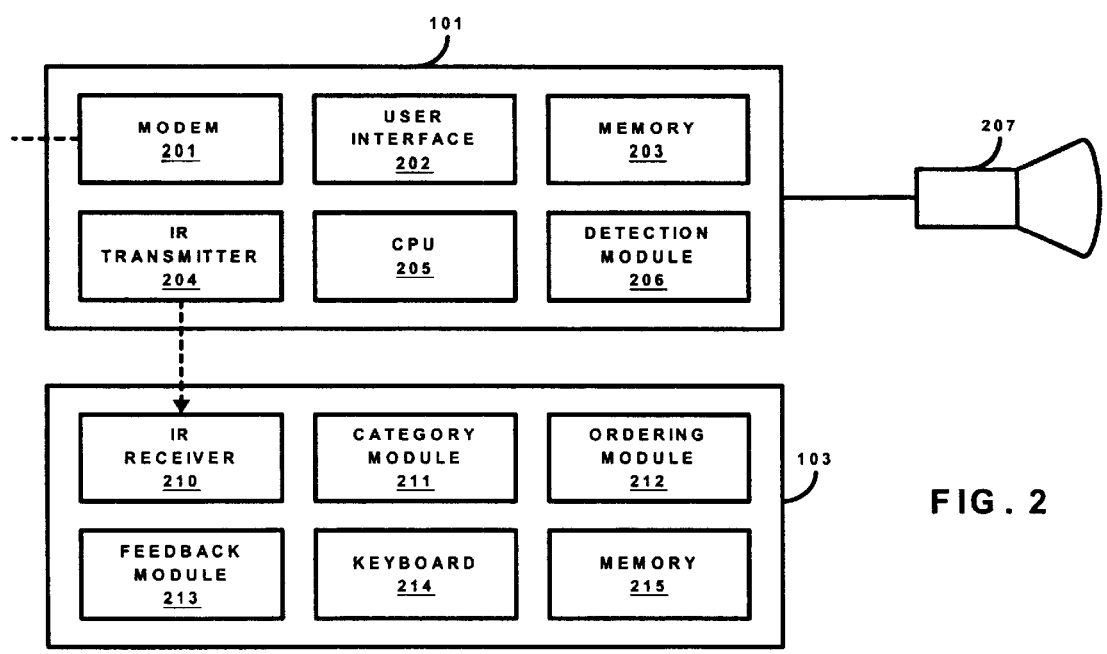
FIG. 2 shows a detailed diagram of a data processing device and universal remote control as part of a further embodiment of the system according to the invention.

FIG. 2 shows a detailed diagram of a data processing device and universal remote control as part of a further embodiment of the system according to the invention. For consistency and ease of understanding, the same reference numerals as in FIG. 1 are used for items having function similar to those presented in FIG. 1. The PC 101 comprises a modem 201, a user interface 202, an internal memory 203, an IR transmitter 204, a central processing unit (CPU) 205 and a detection module 206. The PC 101 further comprises, or is connected to, a monitor 207. The universal remote control 103 comprises an IR receiver 210, a category module 211, an ordering module 212, a feedback module 213, a keyboard 214 and a memory 215.

Figure 3:
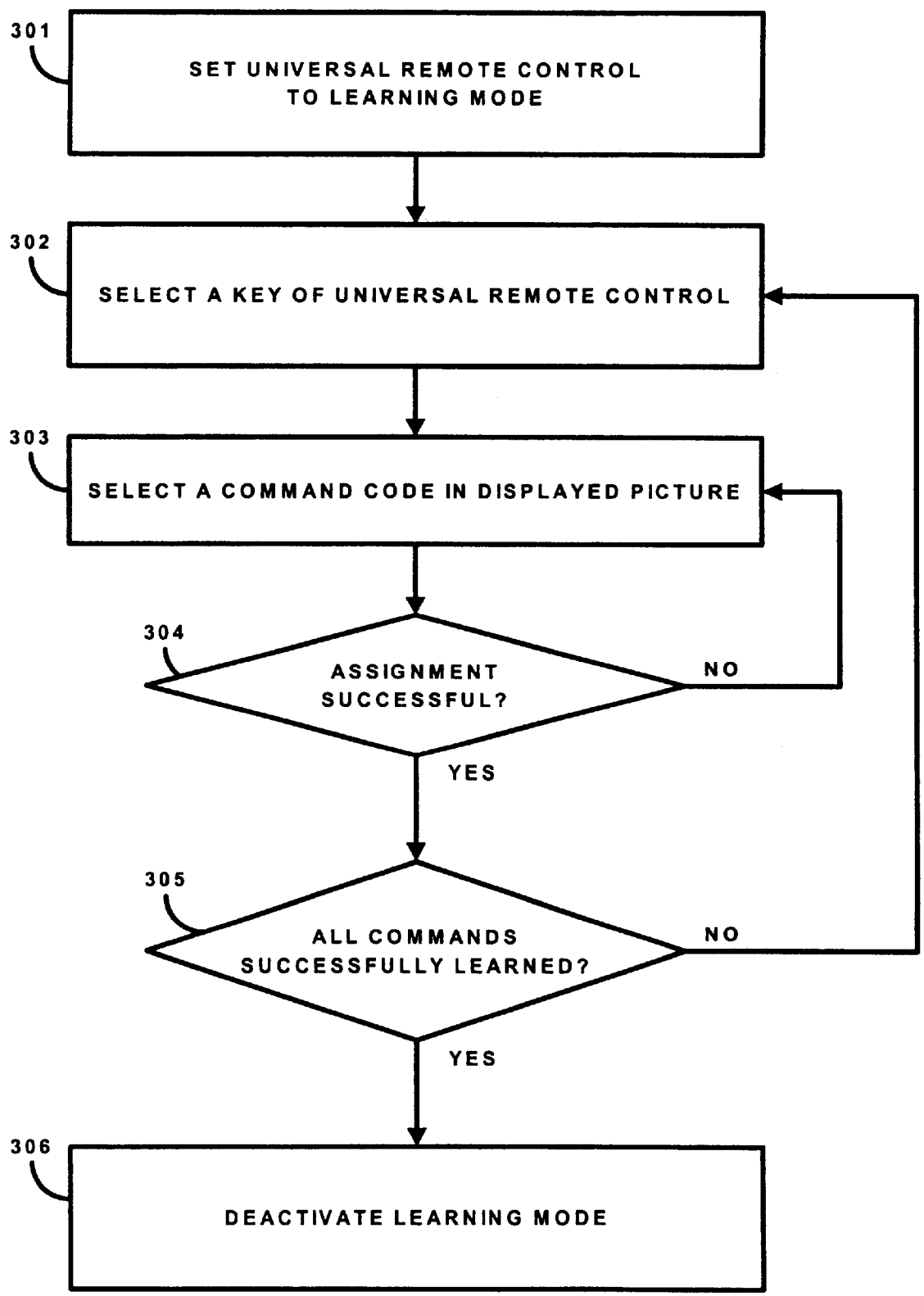
FIGS. 3 to 6 show flow diagrams of the actions performed by the user while controlling various embodiments of the system according to the invention.

The PC 101 is capable of connecting to the remote database 102 by the modem 210, and downloading command codes and storing them in the internal memory 203 of the PC 101. Typically, the remote database is an internet server which enables users to interactively selecting a command code set of a particular electronic appliance for downloading to the user's PC. Along with the command code set, a picture of a control panel of the electronic appliance, e.g. its remote control, is received and displayed on the display screen 207. The user interface 202 comprises a keyboard and a mouse for controlling the PC 101. The user can select a key of the control panel by positioning the cursor 107 on a key shown in the displayed picture. In response to a suitable command, e.g. a mouse click, the command code associated with the selected key is retrieved from the internal memory 203 and transmitted by the IR transmitter 204. The transmitted command code can be received by the universal remote control 103 by placing the IR receiver 210 of the universal remote control 103 in front of the IR transmitter 204 and setting the universal remote control 103 to a learning mode, e.g. by pressing a dedicated key or key-combination (not shown) on the keyboard 214. The received command code is then assigned to a selected key or key combination of the keyboard 214 and stored in the memory 215. The key or key combination of the universal remote control 103 can be selected by simply pressing it while the universal remote control 103 is in the learning mode. FIG. 3 shows a flow diagram of the actions performed by the user, assuming that the command codes have already been transferred to the PC 101. In a step 301 the universal remote control 103 is set to the learning mode. In a step 302 a key of the universal remote control 103 is selected, e.g. by pressing it, and in a step 303 a command code is selected, e.g. by indicating a key in the displayed picture, in order to assign it to the selected key of the universal remote control 103. In a step 304 it is decided whether the assignment was successful, and if not, the step 303 is repeated. In a step 305 it is decided whether all desired command codes have been successfully learned, and if not, a next key and command code are selected in the steps 302 and 303. In a step 306 the learning mode of the universal remote control 103 is deactivated.

Figure 4:
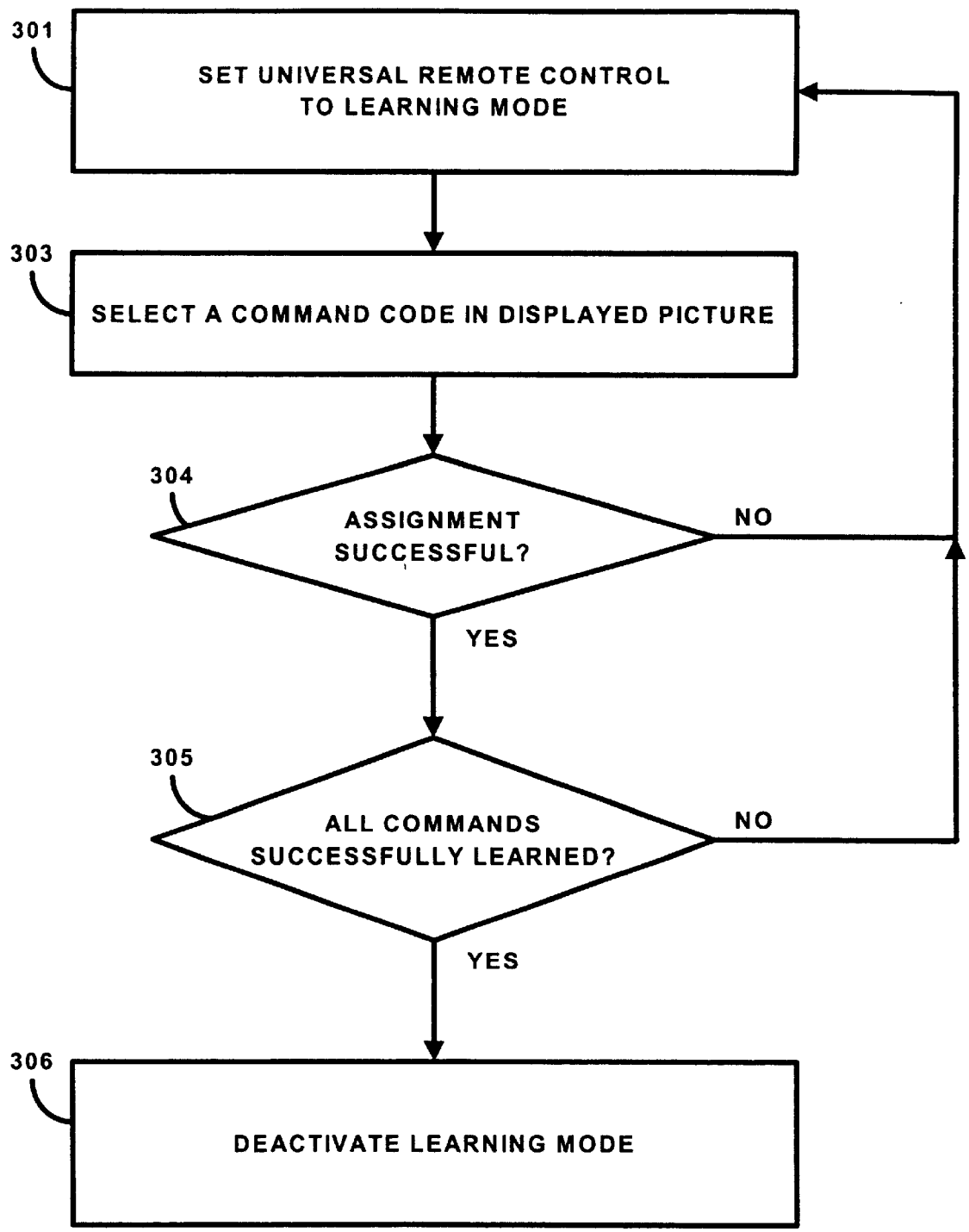

Various methods can be applied instead of, or in addition to, the above method, so as to simplify the way of selecting a key of the universal remote control 103 and/or a command code of the electronic appliance. For example, a predetermined ordering of the keys of the universal remote control 103 is defined by the ordering means 212. Each time a command code has been learned successfully, a next key in accordance with the ordering is selected and the universal remote control 103 starts waiting for the reception of the command code to be assigned to the newly selected key. The user need only indicate a key in the picture of the control panel of which the command code is to be transmitted. If, within a certain period of time, no proper command code is received by the universal remote control 103, the feedback means 213 generates, for example, an auditive signal for warning the user that another attempt to learn the command code is required. FIG. 4 shows a flow diagram of the actions performed by the user in this embodiment, using the same reference numerals as in FIG. 3 for the same or similar steps. In comparison with the embodiment depicted in FIG. 3, the step 302 has been omitted, because keys of the universal remote control 103 are selected automatically.

The ordering may be transferred to the PC 101, e.g. along with the command codes and/or the picture of the control panel, by the modem 201. Now, the user need only indicate whether the next command code must be transmitted or, in the case of a failure, the previous command code. FIG. 4 still depicts this situation, but step 303, i.e. selecting the command code, has become much simpler. Instead of selecting a command code from a large set, the user need only choose between two options: 'repeat' or 'next'.

Figure 5:
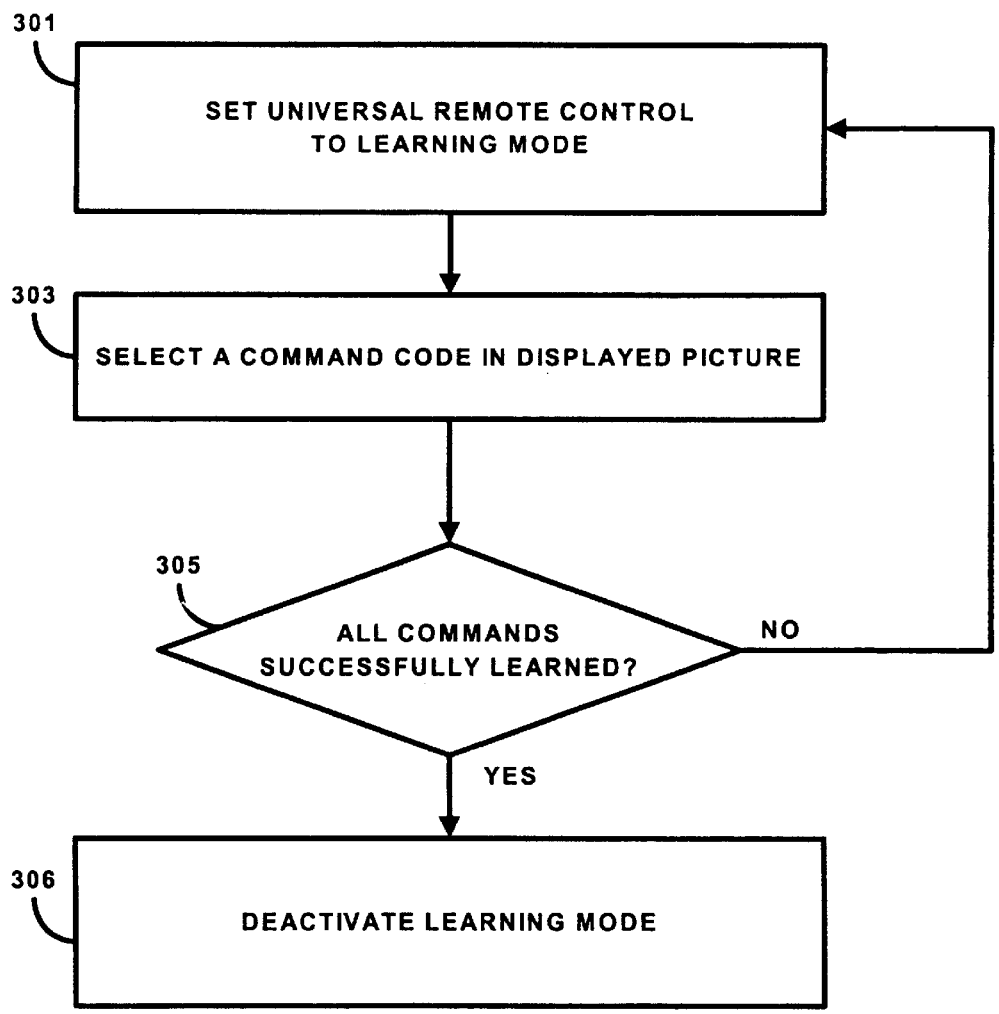
Figure 6:
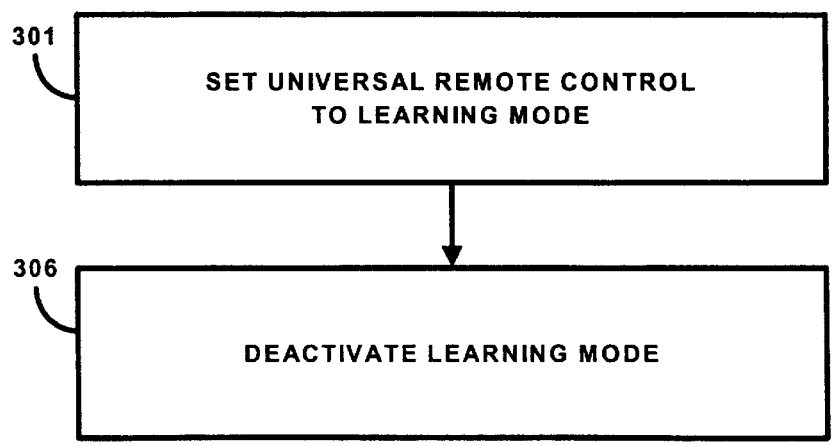

In an advanced embodiment the detection module 206 are capable of detecting the feedback signal generated by the feedback module 213 and of selecting the proper command code in accordance with the feedback signal. For example, if the feedback module 213 generates a signal indicating a failure, the detection module 206 causes the previously transmitted command code to be transmitted again. If the feedback module 213 generates a signal indicating a success, the detection module 206 causes the next command code according to the ordering to be transmitted. This embodiment is depicted by FIG. 5. In comparison with FIG. 4, the step 304 has been omitted, since the detection module 206 perform the selection of the command code. The user only need to issue a 'next' command for causing the next command code to be transferred. In a further embodiment this confirmation step 303 could be omitted, as depicted in FIG. 6, causing the upgrading of the universal remote control 103 to proceed automatically.

In a further embodiment a device category and a function category are associated with the command codes and transferred to the PC101, e.g. along with the command codes and/or the picture of the control panel, by the modem 201, the device category and the function category are transmitted along with the command code, to the universal remote control 103 by IR transmitter 204. Keys of the universal remote control 103 are associated with a device category and a function category by the category module 211. For example, a key of the keyboard 214 may be associated with a video recorder (VCR) device category and a record function category. As soon as a command code which is associated with the categories is received, the command code is automatically mapped to the key. The category information may, for example, be received from the data source 102.

In summary, the invention relates to a method of and system for upgrading a universal remote control with a command code of an electronic appliance. The command code is downloaded from an internet server into a personal computer or a set-top box, which is coupled to an infrared transmitter. The universal remote control is placed in front of the infrared transmitter and the command code is transferred to the universal remote control, for example in response to the user indicating a key, shown in a displayed picture of a control panel of the electronic appliance and associated with the command code.

Although the invention has been described with reference to particular illustrative embodiments, variants and modifications are possible within the scope of the inventive concept. Thus, for example, the invention can be implemented by hardware comprising several distinct elements, and by a suitably programmed computer. Where multiple means are enumerated, several of these means can be embodied by one and the same software module or item of hardware. The command codes learned by the universal remote control may also be suitable to control the remote control itself. For example, the universal remote control may have a programmable user-interface presented on a liquid crystal display. The learned command codes may comprise codes, e.g. control codes and graphical bitmaps, for defining such a graphical user-interface. The keys of the universal remote control may be hardware buttons and/or graphical buttons presented on the LCD as part of such a graphical user-interface.

Throughout this specification the term 'universal remote control' is to be interpreted as any remote control capable of controlling a plurality of user selectable electronic appliances. The appropriate command codes may be prestored by the manufacturer and/or learned in a user-initiated learning mode. Dependent on the amount of memory, the universal remote control may be able to control only one electronic appliance at a time, or a durality of appliances simultaneously without the need for intermediate learning of command codes. Hence, a learning remote control having storage capacity for command codes of only one electronic appliance is regarded as a universal remote control.

The use of the verb "to comprise" does not exclude the presence of elements or steps other than those stated in a claim. In the claims, any reference signs placed between parentheses shall not be construed as limiting the claim. A 'computer program' is to be understood as any software product stored on a computer-readable medium, such as a floppy-disk, downloadable via a network, such as the Internet, or marketable in any other manner.

What is claimed is:

1. A method of operating a data processing device and a universal remote control to program the universal remote control with at least one command code for facilitating an independent user control of at least one electronic appliance by at least one key of the universal remote control, the data processing device including a transmitter and the universal remote control including a receiver for establishing a communication between the data processing device and the universal remote control, the universal remote control being activated in a learning mode for enabling a user of the universal remote control to individually assign each command code to one of the at least one key, the method comprising:

detecting a first key selection of a first key by one of the user and the universal remote control during an activation of the learning mode of the universal remote control, the first key for implementing an independent user control of a first function associated with the at least one electronic appliance;

detecting a first code selection of a first command code by one of the user and the data processing device during the activation of the learning mode of the universal remote control, the first command code for controlling a performance of the first function of the at least one electronic appliance;

communicating the first command code from the data processing device to the universal remote control during the activation of the learning mode of the universal remote control and subsequent to the detection of both the first key selection and the first code selection; and storing a first assignment of the first command code to the first key within the universal remote control during the activation of the learning mode of the universal remote control and subsequent to the communication of the first command code from the data processing device to the universal remote control.

2. The method of claim 1, further comprising:

detecting a second key selection of a second key by one of the user and the universal remote control during the activation of the learning mode of the universal remote control and subsequent to the first assignment of the first command code to the first key within the universal remote control, the second key for implementing an independent user control of a second function associated with the at least one electronic appliance;

detecting a second code selection of a second command code by one of the user and the data processing device during the activation of the learning mode of the universal remote control and subsequent to the first assignment of the first command code to the first key within the universal remote control, the second command code for controlling a performance of the second function by the at least one electronic appliance;

communicating the second command code from the data processing device to the universal remote control during the activation of the learning mode of the universal remote control and subsequent to the detection of both the second key selection and the second code selection; and storing a second assignment of the second command code to the second key within the universal remote control during the activation of the learning mode of the universal remote control and subsequent to the communication of the second command code from the data processing device to the universal remote control.

3. The method of claim 1, further comprising:

detecting a second code selection of a second command code and a device category by one of the user and the data processing device during the activation of the learning mode of the universal remote control and subsequent to the first assignment of the first command code to the fist key within the universal remote control, the device category being representative of a first electronic appliance, the second command code for controlling a performance of a second function by the first electronic appliance;

communicating the second command code and the device category from the data processing device to the universal remote control during the activation of the learning mode of the universal remote control and subsequent to the detection of the second code selection; and subsequent to the communication of the second command code and the device category from the data processing device to the universal remote control, storing a second assignment of the second command code to a second key within the universal remote control based at least partially on the device category during the activation of the learning mode of the universal remote control, the second key for implementing an independent user control of the second function associated with the first electronic appliance.

4. The method of claim 1, further comprising:

detecting a second code selection of a second command code and a function category by one of the user and the data processing function during the activation of the learning mode of the universal remote control and subsequent to the first assignment of the first command code to the first key within the universal remote control, the function category being representative of a second function associated with the at least one electronic appliance, the second command key for controlling a performance of the second function by the at least one electronic appliance;

communicating the second command code and the function category from the data processing function to the universal remote control during the activation of the learning mode of the universal remote control and subsequent to the detection of the second code selection; and subsequent to the communication of the second command code and the function category from the data processing device to the universal remote control, storing a second assignment of the second command code to a second key within the universal remote control based at least partially on the function category during the activation of the learning mode of the universal remote control, the second key for implementing an independent user control of the second function associated with the at least one electronic appliance.

5. The method of claim 1, further comprising:

displaying a graphical user interface on the data processing device, the graphical user interface representative of a control panel of a first electronic appliance,
wherein the detection of the first code selection of the first command code by the user is in response to an interaction of the user with the graphical user interface to indicate a user selection of the first command code during the activation of the learning mode of said universal remote control.

6. A system, comprising:

a universal remote control including at least one key, said universal remote control operable to be activated in a learning mode for enabling a user of said universal remote control to individually assign each command code to one of said at least one key;

a data processing device operable to program said universal remote control with at least one command code for facilitating an independent user control of at least one electronic appliance by said at least one key of said universal remote control; and wherein, during an activation of the learning mode of said universal remote control,
said universal remote control further includes means for detecting a first key selection of a first key by one of the user and the universal remote control, the first key for implementing an independent user control of a first function associated with the at least one electronic appliance,
said data processing device further includes means for detecting a first code selection of a first command code by one of the user and the data processing device, the first command code for controlling a performance of the first function of the at least one electronic appliance,
said data processing device and said universal remote control further include means for communicating the first command code from said data processing device to said universal remote control subsequent to the detection of both the first key selection and the first code selection, and
said universal remote control further includes means for storing a first assignment of the first command code to the first key subsequent to the communication of the first command code from said data processing device to said universal remote control.

7. The system of claim 6, wherein, during an activation of the learning mode of said universal remote control,
said universal remote control further includes means for detecting a second key selection of a second key by one of the user and the universal remote control subsequent to the first assignment of the first command code to the first key within the universal remote control, the second key for implementing an independent user control of a second function associated with the at least one electronic appliance,
said data processing device further includes means for detecting a second code selection of a second command code by one of the user and the data processing device subsequent to the first assignment of the first command code to the first key within the universal remote control, the second command code for controlling a performance of the second function by the at least one electronic appliance,
said data processing device and said universal remote control further include means for communicating the second command code from said data processing device to said universal remote control subsequent to the detection of both the second key selection and the second code selection, and
said universal remote control further includes means for storing a second assignment of the second command code to the second key within said universal remote control subsequent to the communication of the second command code from said data processing device to said universal remote control.

8. The system of claim 6, wherein, during an activation of the learning mode of said universal remote control,
said data processing device further includes means for detecting a second code selection of a second command code and a device category by one of the user and the data processing device subsequent to the first assignment of the first command code to the first key within the universal remote control, the device category being representative of a first electronic appliance, the second command code for controlling a performance of a second function by the first electronic appliance,
said data processing device and said universal remote control further include means for communicating the second command code and the device category from said data processing device to said universal remote control subsequent to the detection of the second code selection, and
subsequent to the communication of the second command code and the device category from said data processing device to said universal remote control, said universal remote control further includes means for storing a second assignment of the second command code to a second key within said universal remote control based at least partially on the device category, the second key for implementing an independent user control of the second function associated with the first electronic appliance.

9. The system of claim 6, wherein, during an activation of the learning mode of said universal remote control,
said data processing device further includes means for detecting a second code selection of a second command code and a function category by one of the user and the data processing function subsequent to the first assignment of the first command code to the first key within the universal remote control, the function category being representative of a second function associated with the at least one electronic appliance, the second command key for controlling a performance of the second function by the at least one electronic appliance, said data processing device and said universal remote control further include means for communicating the second command code and the function category from said data processing function to said universal remote control subsequent to the detection of the second code selection, and subsequent to the communication of the second command code and the function category from said data processing device to said universal remote control, said universal remote control further includes means for storing a second assignment of the second command code to a second key within said universal remote control based at least partially on the function category, the second key for implementing an independent user control of the second function associated with the at least one electronic appliance.

10. The system of claim 6, further comprising:

wherein said data processing device further includes means for displaying a graphical user interface representative of a control panel of a first electronic appliance, wherein the detection of the first code selection of the first command code by the user is in response to an interaction of the user with the graphical user interface to indicate a user selection of the first command code during the activation of the learning mode of said universal remote control.

11. A system, comprising:

a universal remote control including at least one key, said universal remote control operable to be activated in a learning mode for enabling a user of said universal remote control to individually assign each command code to one of said at least one key;

a data processing device operable to program said universal remote control with at least one command code for facilitating an independent user control of at least one electronic appliance by said at least one key of said universal remote control, said data processing device including a transmitter and said universal remote control further including a receiver for establishing a communication between said data processing device and said universal remote controller, and a computer program product in a computer readable medium distributed between said data processing device and said universal remote control, wherein said computer program product includes computer readable code for detecting a first key selection of a first key by one of the user and the universal remote control during an activation of the learning mode of said universal remote control, the first key for implementing an independent user control of a first function associated with the at least one electronic appliance, computer readable code for detecting a first code selection of a first command code by one of the user and the data processing device during the activation of the learning mode of said universal remote control, the first command code for controlling a performance of the first function of the at least one electronic appliance, computer readable code for communicating the first command code from said data processing device to said universal remote control during the activation of the learning mode of said universal remote control and subsequent to the detection of both the first key selection and the first code selection, and computer readable code for storing a first assignment of the first command code to the first key during the activation of the learning mode of said universal remote control during the activation of the learning mode of said universal remote control and subsequent to the communication of the first command code from said data processing device to said universal remote control.

12. The system of claim 11, wherein said computer program product further includes:

computer readable code for detecting a second key selection of a second key by one of the user and the universal remote control during the activation of the learning mode of said universal remote control and subsequent to the first assignment of the first command code to the first key within the universal remote control, the second key for implementing an independent user control of a second function associated with the at least one electronic appliance;

computer readable code for detecting a second code selection of a second command code by one of the user and the data processing device during the activation of the learning mode of said universal remote control and subsequent to the first assignment of the first command code to the first key within the universal remote control, the second command code for controlling a performance of the second function by the at least one electronic appliance;

computer readable code for communicating the second command code from said data processing device to said universal remote control during the activation of the learning mode of said universal remote control and subsequent to the detection of both the second key selection and the second code selection; and computer readable code for storing a second assignment of the second command code to the second key within said universal remote control during the activation of the learning mode of said universal remote control and subsequent to the communication of the second command code from said data processing device to said universal remote control.

13. The system of claim 11, wherein said data processing device further includes means for detecting a second code selection of a second command code and a device category by one of the user and the data processing device during the activation of the learning mode of said universal remote control and subsequent to the first assignment of the first command code to the first key within the universal remote control, the device category being representative of a first electronic appliance, the second command code for controlling a performance of a second function by the first electronic appliance;

wherein said data processing device and said universal remote control further include means for communicating the second command code and the device category from said data processing device to said universal remote control during the activation of the learning mode of said universal remote control and subsequent to the detection of the second code selection; and wherein, during the activation of the learning mode of said universal remote control and subsequent to the communication of the second command code and the device category from said data processing device to said universal remote control, said universal remote control further includes means for storing a second assignment of the second command code to a second key within said universal remote control based at least partially on the device category, the second key for implementing an independent user control of the second function associated with the first electronic appliance.

14. The system of claim 11, wherein said computer program product further includes:

computer readable code for detecting a second code selection of a second command code and a function category by one of the user and the data processing function during the activation of the learning mode of said universal remote control and subsequent to the first assignment of the first command code to the first key within the universal remote control, the function category being representative of a second function associated with the at least one electronic appliance, the second command key for controlling a performance of the second function by the at least one electronic appliance;

computer readable code for communicating the second command code and the function category from said data processing function to said universal remote control during the activation of the learning mode of said universal remote control and subsequent to the detection of the second code selection; and computer readable code for, during the activation of the learning mode of said universal remote control and subsequent to the communication of the second command code and the function category from said data processing device to said universal remote control, storing a second assignment of the second command code to a second key within said universal remote control based at least partially on the function category, the second key for implementing an independent user control of the second function associated with the at least one electronic appliance.

15. The system of claim 11, wherein said computer program product further includes computer readable code for displaying a graphical user interface on said data processing device, the graphical user interface being representative of a control panel of a first electronic appliance, wherein the detection of the first code selection of the first command code by the user is in response to an interaction of the user with the graphical user interface to indicate a user selection of the first command code during the activation of the learning mode of said universal remote control.

* * * * *